R. L. MILLS.
Improvement in Coffee-Roasters.
No. 115,228.
2 Sheets--Sheet 2.
Patented May 23, 1871.
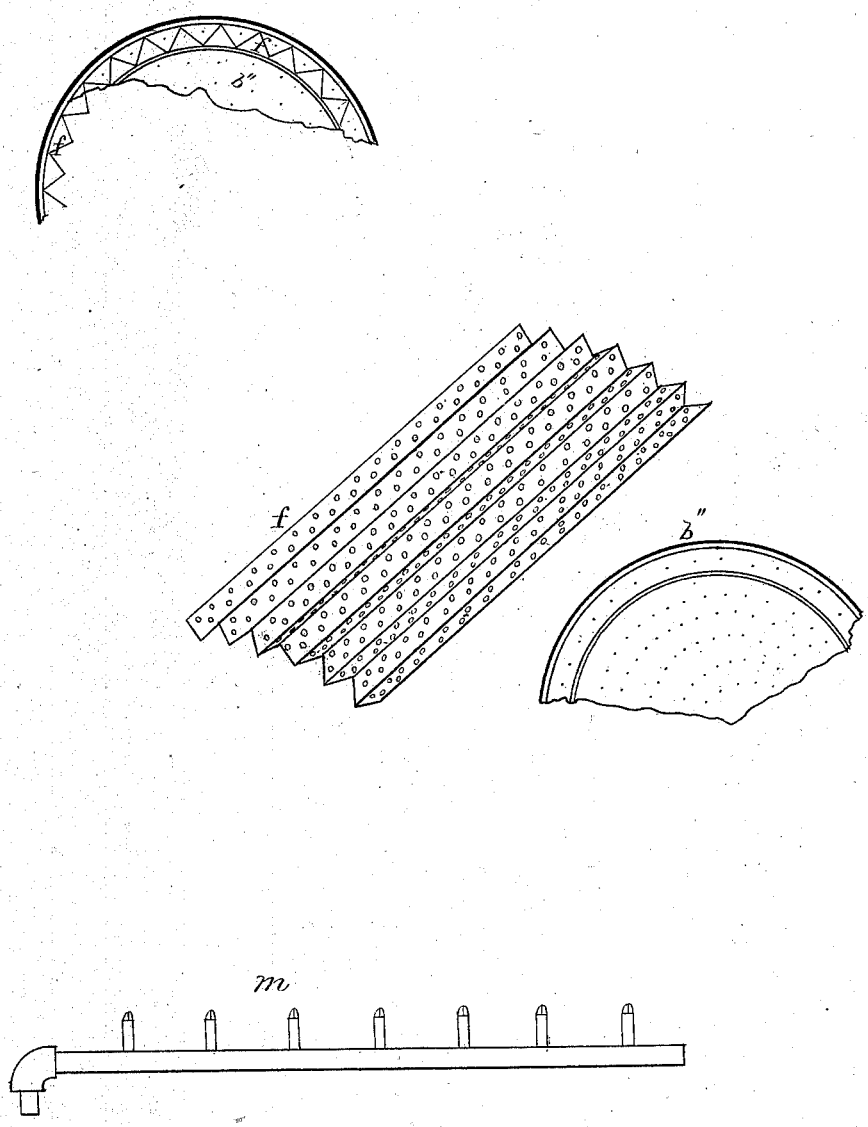

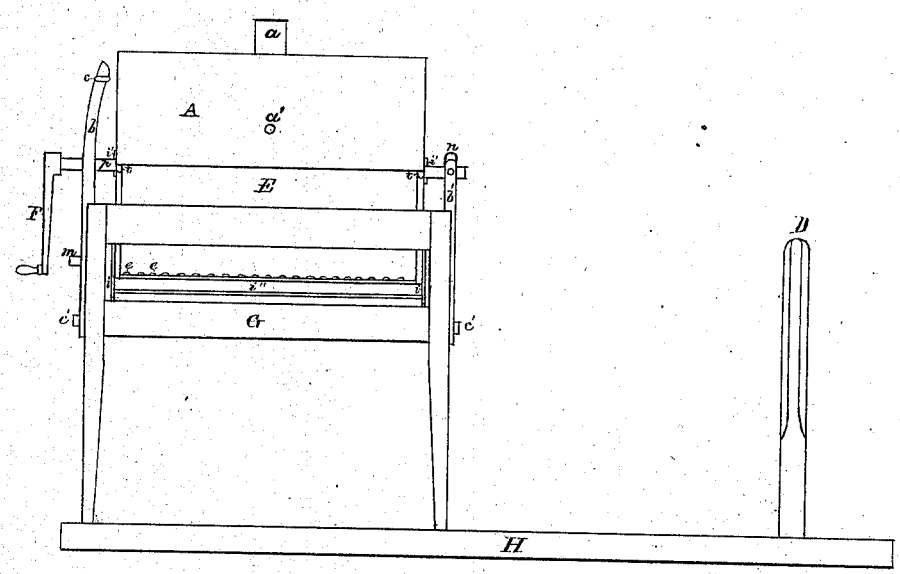

United States Patent Office.

RICHARD L. MILLS, OF SPRINGFIELD, OHIO.

Letters Patent No. 115,228, dated May 23, 1871.

IMPROVEMENT IN COFFEE-ROASTERS.

The Schedule referred to in these Letters Patent and making part of the same.

I, RICHARD L. MILLS, of the city of Springfield, in the county of Clark and State of Ohio, have invented certain Improvements in Coffee and Nut-Roasters, of which the following is a specification.

My invention relates to that class of coffee and nut-roasters in which the nuts or coffee are placed in a cylinder hung upon a shaft or journals and turned by hand or other power to bring all parts of its sides in contact with the heat applied to the same, the rotation keeping the nuts or coffee so stirred as to prevent burning.

The first part of my invention consists in the construction of a cylinder of sheet metal, having an inner cylinder or lining of a corrugated form. The inner cylinder may be made of perforated sheet metal or of wire-gauze, the corrugations running lengthwise of the same, their object being to facilitate the process of roasting the coffee or nuts by more thoroughly stirring and constantly changing the position of the contents of the cylinder, so that the whole shall be uniformly and evenly done.

The second part of my invention consists in a peculiar construction and arrangement of the heating-furnace and parts attached thereto, so as to adapt it to the use of gas, coke, or charcoal, with adjustable parts to facilitate the removal of ashes or fire therefrom, to regulate the draught, and to cool it off.

The third part of my invention consists in a novel arrangement of the frame-work of the machine, the manner of attaching the roasting-cylinder to the same, of supporting it when being filled and when discharging its contents.

Figure 1 is an elevation of my nut and coffee-roaster, the roasting-cylinder being inclosed, the whole resting in a metal frame. It also shows the post D, which is used as a support for the cylinder when discharging its contents. Both are mounted on platform H.

Figure 2 is a plan view of the machine open, the cover A being thrown back and the roasting-cylinder laid over with the crank end of its shaft resting in the fork of post D.

Figure 3 is a view of the end on the left in fig. 2, showing a section of cover A as attached.

Figure 4 is a view of one of the outer furnace-plates.

Figure 5 is a section of the end of the frame on the right in figs. 1 and 2.

A is the top cover, of sheet metal, semi-cylindrical in shape, and is hinged by short bars pivoted to the rear of the end plates A' of the furnace, as seen in fig. 3.

$a$ is the chimney for the escape of smoke, steam, and gas.

$a'$ is a knob or handle to raise the cover A.

B, fig. 2, is the roasting-cylinder, which is made double.

The outer part $f'$ is of sheet metal, and it and the heads, as seen at $b''$, fig. 2, are pierced with minute holes for the escape of steam.

The inner cylinder is made of perforated sheet metal, (or may be of wire-gauze,) of corrugated form, (see $f$, fig. 2, where a section of $f'$ is cut out,) and is supported by projections or flanges on the heads $b''$ and $b''$, so as to leave a space for heated air between it and outer case $f'$.

The coffee or nuts are put in and emptied out through the opening $g'$.

The door $g$ shuts this opening, and is fastened by a slide-bolt.

In fig. 2 the cylinder is shown in an inclined position, the shaft $p$ on the right resting in the fork of post D, which is lower than the other end of the shaft attached to the upright $b'$ by the collar $n$, through which it passes and is secured by a pin.

This collar rests on journals and forms a swivel or cross-joint, and allows the cylinder B to be partially rotated on it (as a center) endwise in turning it out from the furnace over on the post D, (the crank end of the cylinder describing a curvilinear movement equal to rather more than half a circle.) This operation is for discharging the coffee or nuts when they are sufficiently roasted to take out. The hole $g'$ is turned under for that purpose, the nuts or coffee running down to that end.

In filling the cylinder the crank end on the left, fig. 1, is simply raised up out of the furnace, after the cover A is thrown back, to the top of the forked upright $b$, its shaft resting on the pin $c$, (which is pulled out and slipped under it,) the door of the cylinder, $g$, turned up and opened, and the nuts or coffee poured in.

The inclination of the cylinder allows the contents to run toward the lower end, a slight shake aiding to settle them down. When filled it is lowered into place, the cover A closed, and it is ready for operation.

When coal or coke is used it is put in between the outer furnace-plates E and the grate C.

Plates E slide down in grooves or between flanges on the inner part of the end plates A' until their bottom edges reach the lower part of grate-pieces C, which extend downward perpendicularly.

The pivoted bar-hinges $i'$ allow the cover A to be thrown back far enough to withdraw the outer furnace-plate E on the back side, same as the front one.

Holes $e\ e$ in this plate (fig. 4) admit air and aid the draught.

The construction of the furnace in a semicircular form, as shown, brings the heat in contact with nearly one-half the cylinder at a time.

There is sufficient space between the perpendicular portions of the grate-pieces C to allow the dust and ashes to sift through.

When necessary to discharge ashes, coal, or coke from the furnace, or withdraw the fire for the purpose of cooling off the machine, the furnace-plates E, front and rear, are drawn out by the handles $h$.

The hooks or lugs $t$ on their upper corners aid in keeping them in place when shoved down, as they hook over the top of the flange on the end plates A'.

To facilitate the process of cooling off the machine and discharging the contents of the furnace the lower parts of the end plates A' are hinged by bolts $c'$ to the frame G so that they can be opened apart, as shown in fig. 3.

The braces $i$, which are seen in same figure, hold them together when closed.

These are pivoted at their upper ends to A', their lower ends, which are notched, resting on the lower front and rear bars of the frame. They are connected by rods, $i''$, running lengthwise, and when thrown out over the frame-bar, as seen on the right in fig. 3, allow A' A' to fall apart. By taking hold of the rod $i''$ and shaking the grates all the dust and ashes are easily sifted out.

The frame G is made of metal, and its novel features consist of its uprights $b$ and $b'$ and their attachments, as seen in figs. 3 and 5, $b$ being forked and of a slightly-curved shape, and rising nearly to the height of the cover A, and having the pin C at the top for resting the cylinder upon, as before described. $b'$ is shorter, being only sufficiently high for the horizontal bearing of the shaft $p$, the end of which, projecting from the cylinder, rests in the collar $n$ in the fork of $b'$. This collar $n$ works on journals at right angles with the cylinder-shaft, (see fig. 5.) The construction of these parts is essential to the curvilinear movements by which the cylinder is placed on the post D, fig. 2.

I do not claim the use of a cylinder made double for roasting coffee and nuts, as the same has been used before; nor do I claim corrugating sheet metal to form a cylinder, as the same has been used for water-conductors; but

What I claim as new is—

1. The corrugated lining or inner cylinder $f$, in combination with the outer casing $f'$ in cylinder B, substantially as and for the purpose hereinbefore set forth.

2. The three bearing points for the cylinder, consisting of upright $b$, collar $n$, and post D, substantially as described, for the purpose set forth.

3. Bearing-pin $c$, upright $b$, collar $n$, upright $b'$, and cylinder B, in combination, substantially as and for the purpose hereinbefore set forth.

4. The adjustable furnace mechanism, consisting of the hinged end plates A', outer furnace-plates E, grates C, locking-braces $i$, and rods $i''$, substantially as shown and described, for the purpose set forth.

5. Frame G, in combination with the adjustable furnace mechanism and roasting-cylinder described, substantially as and for the purpose hereinbefore set forth.

6. Gas-pipe $m$, in combination with cylinder B, cover A, end plates A', outer furnace-plates E, and frame G, substantially as described, for the purpose hereinbefore set forth.

RICHD. L. MILLS.

Witnesses:
B. C. CONVERSE,
GEO. C. RAWLINS.